United States Patent
Sakamoto et al.

(10) Patent No.: US 9,970,751 B2
(45) Date of Patent: May 15, 2018

(54) OPTICAL AXIS ANGLE INSPECTION DEVICE

(71) Applicant: HONDA MOTOR CO., LTD., Minato-ku, Tokyo (JP)

(72) Inventors: Akira Sakamoto, Tokyo (JP); Tatsuya Sakai, Tokyo (JP); Yoshitaka Hirai, Tokyo (JP); Hirotaka Itoh, Tokyo (JP); Takayuki Ogawa, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 361 days.

(21) Appl. No.: 14/909,698

(22) PCT Filed: Jun. 3, 2014

(86) PCT No.: PCT/JP2014/064728
§ 371 (c)(1),
(2) Date: Feb. 2, 2016

(87) PCT Pub. No.: WO2015/019693
PCT Pub. Date: Feb. 12, 2015

(65) Prior Publication Data
US 2016/0216105 A1    Jul. 28, 2016

(30) Foreign Application Priority Data
Aug. 8, 2013    (JP) .................................. 2013-165057

(51) Int. Cl.
*G01C 3/08*    (2006.01)
*G01B 11/26*    (2006.01)
(Continued)

(52) U.S. Cl.
CPC ............ *G01B 11/26* (2013.01); *G01B 11/272* (2013.01); *G01C 5/00* (2013.01); *G01S 7/4972* (2013.01);
(Continued)

(58) Field of Classification Search
CPC ...... G01B 11/272; G01B 11/26; G05D 1/024; G01C 5/00; G01S 7/4972
(Continued)

(56) References Cited

U.S. PATENT DOCUMENTS 4,238,828 A    12/1980    Hay et al.
2013/0021617 A1    1/2013    Hjelmstrom et al.

FOREIGN PATENT DOCUMENTS

CN    1758018 A    4/2006
CN    102889879 A    1/2013
(Continued)

OTHER PUBLICATIONS

Office Action dated Apr. 28, 2017 in the corresponding Chinese Patent Application 201480038771.8 with the English machine translation thereof.

*Primary Examiner* — Mark Hellner
(74) *Attorney, Agent, or Firm* — Carrier Blackman & Associates, P.C.; Joseph P. Carrier; William D. Blackman (57) ABSTRACT

An optical axis angle inspection device is provided with a first camera and a screen which are disposed in front of a laser distance meter, is provided with a point light source on the screen, and is provided with a second camera disposed behind the laser distance meter. An image of the laser distance meter is captured by the first camera, and the height of the point light source is fitted to the height of the laser distance meter on the basis of the captured image. Then, an image of the point light source is captured by the second camera, and a difference in height between the centroid of the captured image and the point light source is specified. The optical axis angle of the laser distance meter is calculated from the difference in height and the distance from the screen to the laser distance meter.

3 Claims, 8 Drawing Sheets

(51) Int. Cl.
  *G01B 11/27* (2006.01)
  *G01S 17/93* (2006.01)
  *G01S 7/497* (2006.01)
  *G01C 5/00* (2006.01)
  *G05D 1/02* (2006.01)
(52) U.S. Cl.
  CPC ............ *G01S 17/936* (2013.01); *G05D 1/024* (2013.01); *G05D 2201/0213* (2013.01)
(58) Field of Classification Search
  USPC ........................................................ 356/4.01
  See application file for complete search history.

(56) References Cited

FOREIGN PATENT DOCUMENTS

| | | |
|---|---|---|
| DE | 28 43 740 A1 | 4/1979 |
| EP | 1 437 568 A2 | 7/2004 |
| EP | 1 953 520 A2 | 8/2008 |
| JP | S59-024232 A | 2/1984 |
| JP | S60-22609 A | 2/1985 |
| JP | 02-038940 A | 2/1990 |
| JP | 2004-205398 A | 7/2004 |
| JP | 2005-140508 A | 6/2005 |
| JP | 2012-078147 A | 4/2012 |

OPTICAL AXIS ANGLE INSPECTION DEVICE

TECHNICAL FIELD

The present invention relates to an optical axis angle inspection device for inspecting an optical axis angle of a laser distance meter mounted on a vehicle.

BACKGROUND ART

In recent years, a distance meter has come to be installed in vehicles. The distance meter measures a distance between an own vehicle and a vehicle immediately on the front side of the own vehicle (hereinafter referred to as "preceding vehicle") and detects as to whether an inter-vehicle distance is proper.

In one form of the distance meter, laser light is used. The laser distance meter irradiates laser light in a forward direction of the vehicle and receives reflected light to calculate a distance.

The laser light is advantageous for its high rectilinear advancing property and non-diffusing performance. The laser distance meter is mounted on the vehicle by using a bracket. The bracket inevitably involves product dispersion caused due to manufacture thereof. In addition, a mounting error may occur when the bracket is mounted on the vehicle or when the laser distance meter is mounted on the bracket.

Depending on the product dispersion and the mounting error, a risk may arise that an optical axis of the laser distance meter mounted on the vehicle deviates from a predetermined angle. If the optical axis deviate from the predetermined angle, the reliability of a detected distance will decrease. The laser distance meter therefore needs an inspection as a single component and an additional inspection in an on-vehicle state.

Figure 1:
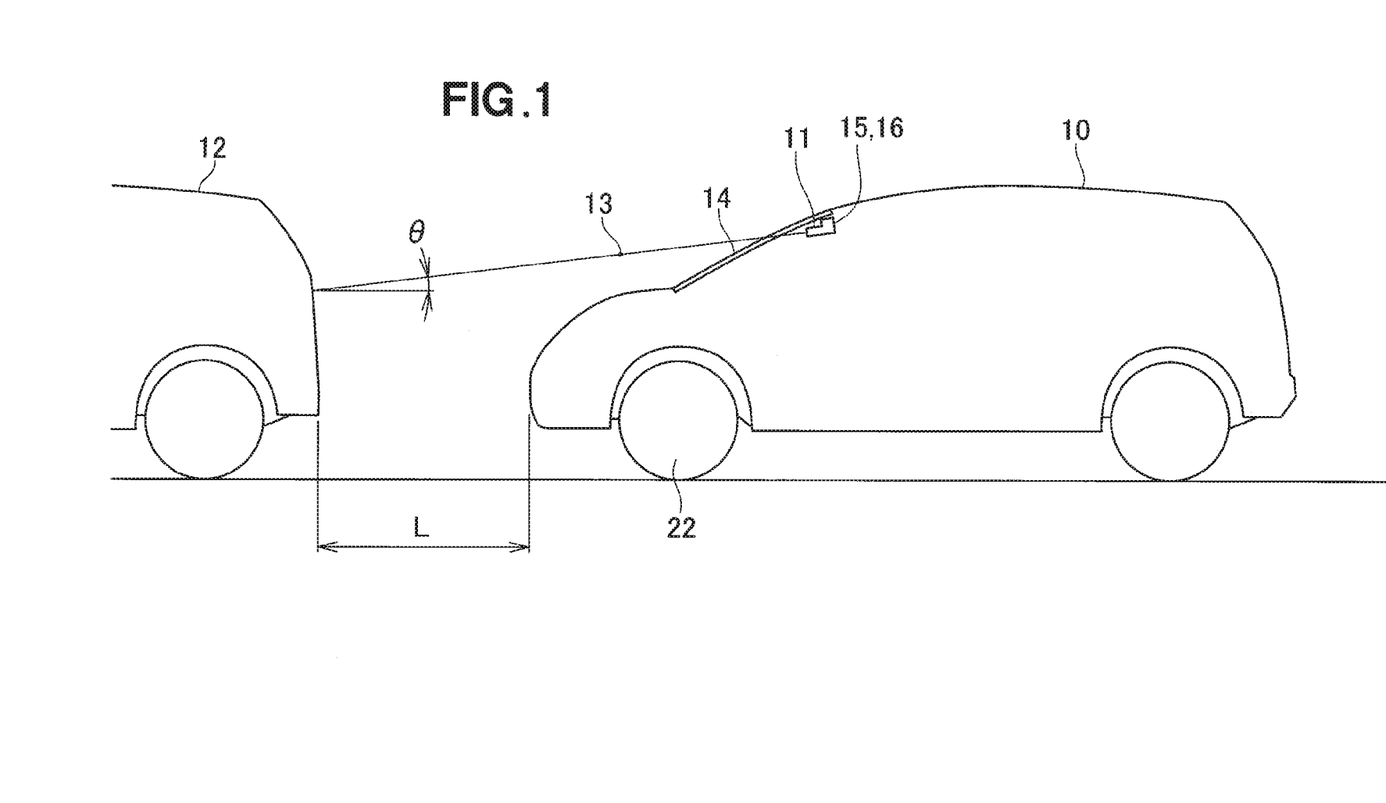
FIG. 1 is a side view of a vehicle provided with a laser distance meter.

Methods for inspecting an optical axis angle of a camera mounted on the vehicle are known (see, for example, Patent Document 1, FIG. 1).

Figure 10:
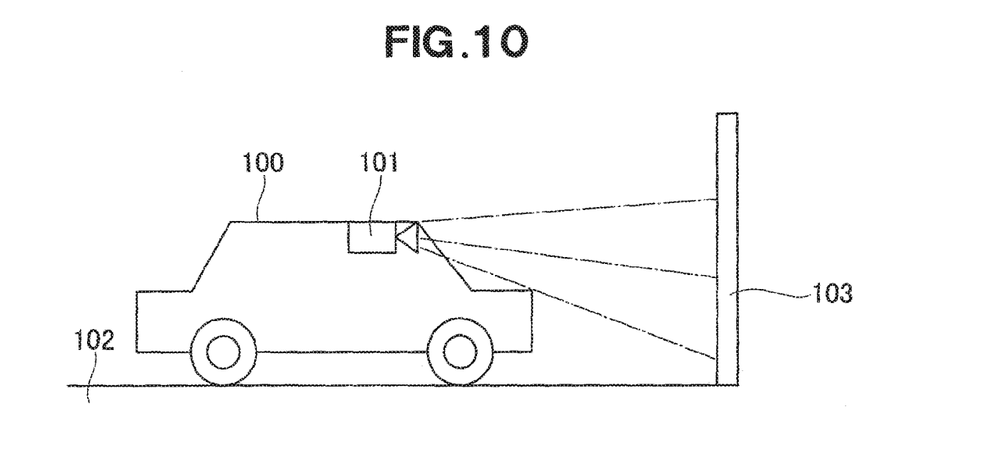
FIG. 10 is a view illustrative of a conventional optical axis inspection device for on vehicle cameras.

FIG. 10 herein is a view explanatory of a conventional optical axis inspection device for on-vehicle cameras, in which a vehicle 100 includes a camera 101 mounted thereon. The vehicle 100 is carried on a horizontal base 102, and a mirror 103 is standing upright at one end of the horizontal base 102. The mirror 103 is used for evaluating an optical axis 104 of the camera 101.

By replacing the camera 101 with a laser distance meter, it is possible to evaluate an optical axis of the laser distance meter.

The mirror 103 is disposed on a front side of the vehicle 100 at a distance corresponding to about half the length of the vehicle 100. Because the vehicle length is about 6 meters, the mirror 103 is raised to the position about 3 meters forward from the vehicle 100. As a result, the inspection device becomes long.

Due to the demand for compactification of an inspection device and reduction of an inspection area, it is necessary for an inspection device to have a shorter length along a line.

PRIOR ART LITERATURE

Patent Documents

[Patent Document 1] Japanese Patent Application Laid-open Publication (JP-A) No. 2005-140508.

SUMMARY OF INVENTION

Technical Problems

The present invention has for its object the provision of a compact optical axis angle inspection device.

Solutions to Problems

According to the present invention, there is provided an optical axis angle inspection device for inspecting an optical axis angle of a laser distance meter mounted on a vehicle, the optical axis angle inspection device comprising: a vehicle positioning mechanism for positioning the vehicle in a predetermined position; a first camera vertically movably suspended by a first lift mechanism at a position rearward of front ends of front wheels of the vehicle and forward of the laser distance meter for capturing an image of laser distance meter; a screen suspended by the first lift mechanism for projection with an image of light emitted from the laser distance meter; a point light source provided on the screen at a position separated from the first camera by a difference in height from the first camera to the laser distance meter determined based on an angle of inclination of an optical axis of the first camera with respect to the horizontal and a horizontal distance from the first camera to the laser distance meter; a second camera vertically movably suspended by a second lift mechanism at a position rearward of the screen in a front-and-rear direction of the vehicle for capturing the image projected on the screen and the point light source; a height control unit which calculates a shift amount between the image picked up by the first camera and a reference image and operates the first lift mechanism to raise and lower the first camera and the screen in such a manner as to eliminate the shift amount; a centroid calculation unit which, after completion of the control by the height control unit, obtains from the second camera the optical image projected on the screen based on the light emitted from the laser distance meter and calculates coordinates of a centroid of the optical image; an angle calculation unit which calculates an optical axis angle of the laser distance meter from two items of information consisting of a difference in height from the centroid of the optical image obtained from the centroid calculation unit and a distance from the screen to the laser distance meter; and an acceptance/non-acceptance determination unit which determines whether a calculated optical axis angle value obtained by the angle calculation unit satisfies an acceptability criterion of the optical axis angle.

Preferably, the height control unit performs control of the second lift mechanism in synchronism with control of the first lift mechanism.

It is preferable that the screen has a light receiving surface colored in black.

Advantageous Effects of Invention

According to a preferred form of the invention, the screen is located at the position rearward of the front ends of the front wheels of the vehicle and forward of the laser distance meter. Since the screen is not located forwardly of the vehicle, the length of the inspection device along the line can be reduced. A compact optical axis angle inspection device can thus be provided.

Since the screen is located close to the laser distance meter, it is less subjected to the effect of external light. A light shielding cover is therefore not necessary, and simplification of the optical axis angle inspection device can be achieved.

In the invention, the second lift mechanism is controlled simultaneously with the first lift mechanism. This means that the screen suspended by the first lift mechanism and the second camera suspended by the second lift mechanism are raised and lowered concurrently. With the screen and the second camera thus raised and lowered concurrently, the screen can be always kept in a visual field of the second camera.

In the invention, since the light receiving surface of the screen is colored in black, the point light source provided on the screen contrasts finely with the black light receiving surface. This will ensure that the second camera can reliably capture an image of the point light source.

DESCRIPTION OF EMBODIMENT

A certain preferred embodiment of the present invention will be described below with reference to the accompanying sheets of drawings.

Embodiment

As shown in FIG. 1, a vehicle 10 is equipped with a laser distance meter 11. The laser distance meter 11 irradiates laser light 12 to a preceding vehicle 12 so that an inter-vehicle distance between the vehicle (own vehicle) 10 and the preceding vehicle 12 can be measured. An optical axis angle θ, which is an angle of an optical axis of the laser light 13 relative to a horizontal axis, is important and should be kept within a reference range. The present invention relates to an optical axis angle inspection device for confirming that the optical axis angle θ is kept within the reference range.

Figure 2:
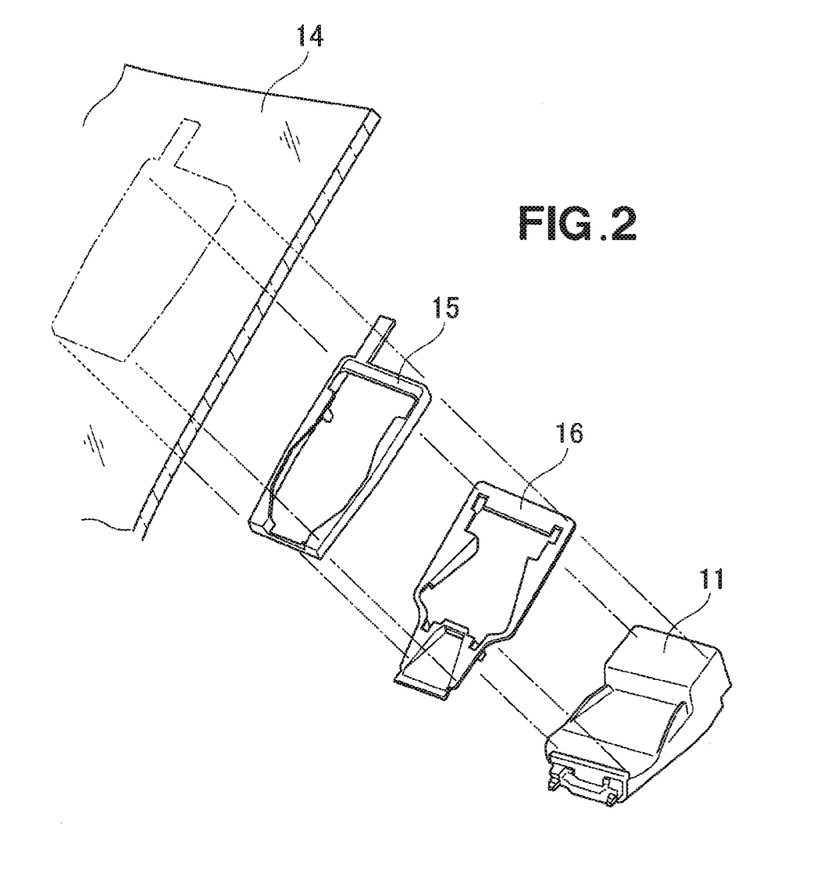
FIG. 2 is a perspective view of a bracket for fixing the laser distance meter to a windshield.

As shown in FIG. 2, the laser distance meter 11 is mounted on a windshield 14 of the vehicle 10 by using brackets 15, 16. The windshield 14 is made of a curved glass and involves dimensional variations. Further, the brackets 15, 16 also involve dimensional variations. Since the bracket 15 is fixed by bonding to the windshield 14, variations in a mounting angle of the laser distance meter 11 will inevitably occur.

It is therefore important to inspect the optical axis angle of the laser distance meter 11 in a state where the laser distance meter 11 is mounted on the vehicle 10.

Figure 3:
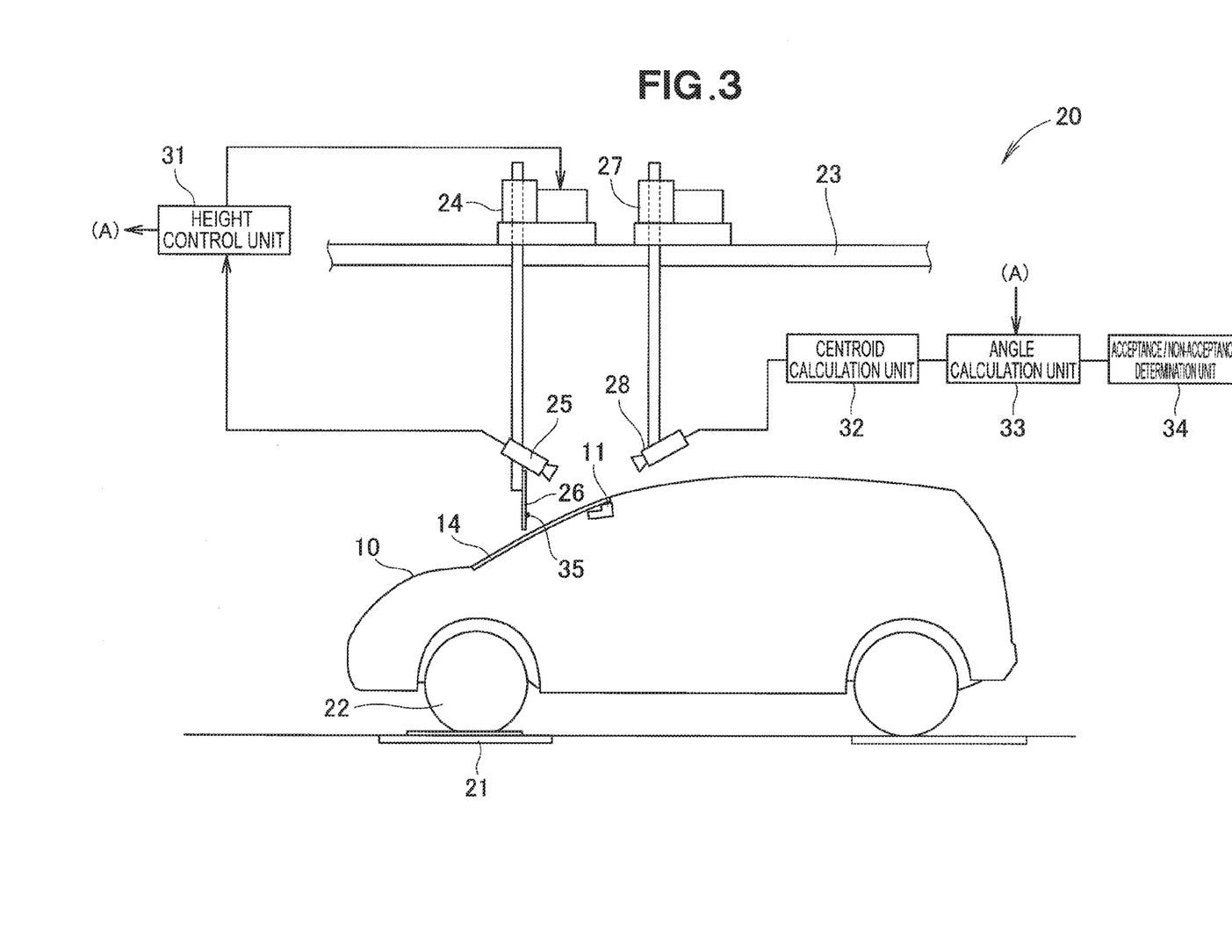
FIG. 3 is a view illustrative of a configuration of an optical axis angle inspection device according to the present invention.

As shown in FIG. 3, the optical axis angle inspection device 20 includes a vehicle positioning mechanism 21 provided in a transfer path of the vehicle 10 for positioning the vehicle 10 in a predetermined position. The optical axis angle inspection device 20 includes a first camera 25 and a screen 26 that are provided at a position which is rearward of front ends of front wheels 22 of the vehicle 10 and which is forward of the laser distance meter 11. The first camera 25 and the screen 26 are vertically movably suspended by a first lift mechanism 24 supported on a beam 23. The screen 26 is provided for projection with light emitted from the laser distance meter 11.

The optical axis angle inspection device 20 also includes a second camera 28 for capturing an image projected on the screen 26 at a position rearward of the screen 26 in a front-and-rear direction of the vehicle. The second camera 28 is vertically movably suspended by a second lift mechanism 27 supported on the beam 23.

The optical axis angle inspection device 20 comprises a height control unit 31 which calculates a shift amount of an image captured by the first camera 25 and a previously stored reference image and operates the first lift mechanism 24 to raise and lower the first camera 25 and the screen 26 in such a manner as to eliminate the calculated shift amount, a centroid calculation unit 32 which, after completion of the control by the height control unit 31, obtains from the second camera 28 an optical image projected on the screen 26 based on emission light of the laser distance meter 11 and calculates the coordinates of a centroid of the obtained optical image, an angle calculation unit 33 which calculates an optical axis angle of the laser distance meter 11, and an acceptance/non-acceptance determination unit 34 which determines whether a calculated optical axis angle value obtained by the angle calculation unit 33 satisfies an acceptability criterion of the optical axis angle.

The beam 23 may be a beam arranged in a building, or a gate-shaped frame self-supporting on a ground. The beam should by no means be limited to a beam in the narrow sense but may include any element as long as it can keep the first and second lift mechanisms 24, 27 at a predetermined height.

The first and second lift mechanisms 24, 27 may preferably be comprised of a mechanical jack which includes a ball screw, a nut, and a warm wheel and which is driven by a motor.

It is preferable that the first camera 25 is a visible light camera, and the second camera 28 is an infrared camera.

Next, the configuration of the optical axis angle inspection device 20 will be described in detail with reference to FIG. 4 which is an enlarged view of a part of FIG. 3.

Figure 4:
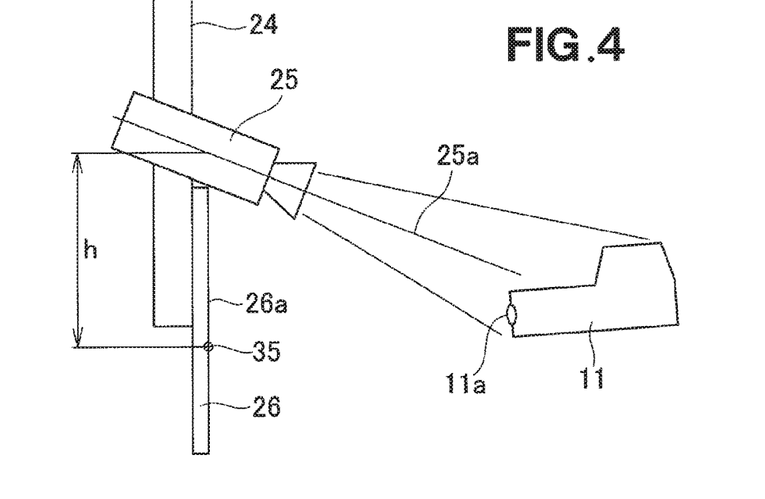
FIG. 4 is a view illustrative of the operation of a first camera.

As shown in FIG. 4, a point light source 35 is provided on a right receiving surface 26a of the screen 26. The point light source 35 needs to be the same height as a lens 11a of the laser distance meter 11. A method of setting the height will be described.

The first lift mechanism 24 merely operates to raise and lower the first camera 25, and an angle of inclination of an optical axis 25a of the first camera 25 with respect to the horizontal is constant. A horizontal distance between the screen 26 and the laser distance meter 11 is also constant. From the constant inclination angle and the constant horizontal distance, a difference "h" in height from the first camera 25 to the laser distance meter 11 can be obtained geometrically. The point light source 35 is located downwardly from the first camera 25 by a distance equal to the difference "h" in height. The point light source 35 is preferably constituted by a red light emitting diode lamp.

A relative position between the first camera 25 and the point light source 35 is thus determined. However, a relative position between the point light source 35 and the laser distance meter 11 has not been determined as yet. A procedure for setting a relative position between the point light source 35 and the laser distance meter 11 will be described below.

Figure 5:
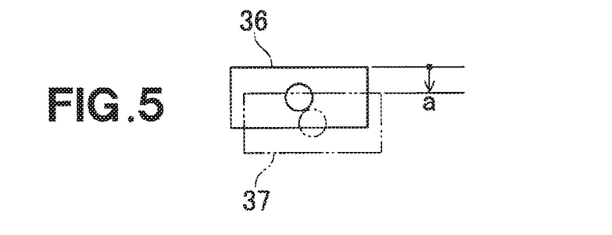
FIG. 5 is a schematic view of an image captured by the first camera.

At first, the first camera 25 picks up or captures an image of the laser distance meter 11. An image picked up by the first camera 25 is a captured image 36 indicated by solid lines shown in FIG. 5. A reference image 37 previously stored in the first camera 25 is indicated by phantom lines. As shown in FIG. 5, a shift amount "a" is present.

In FIG. 4, the first camera 25 is lowered by a distance equal to the shift amount "a", so that the shift amount shown in FIG. 5 is zero or eliminated. As a result, in FIG. 4, a height of the lens 11a of the laser distance meter 11 and a height of the point light source 35 are made coincident with each other.

Near-infrared rays have a wavelength region of from 0.78 to 2.0 μm. YAG (Yttrium-Aluminum-Garnet) lasers have a fundamental wavelength of 1.064 μm which is included in the near-infrared region. Yb (Ytterbium) lasers have a wavelength of 1.09 μm which is included in the near-infrared region. It is recommended that a laser distance meter 11 employing a near-infrared irradiation laser be used.

Figure 6:
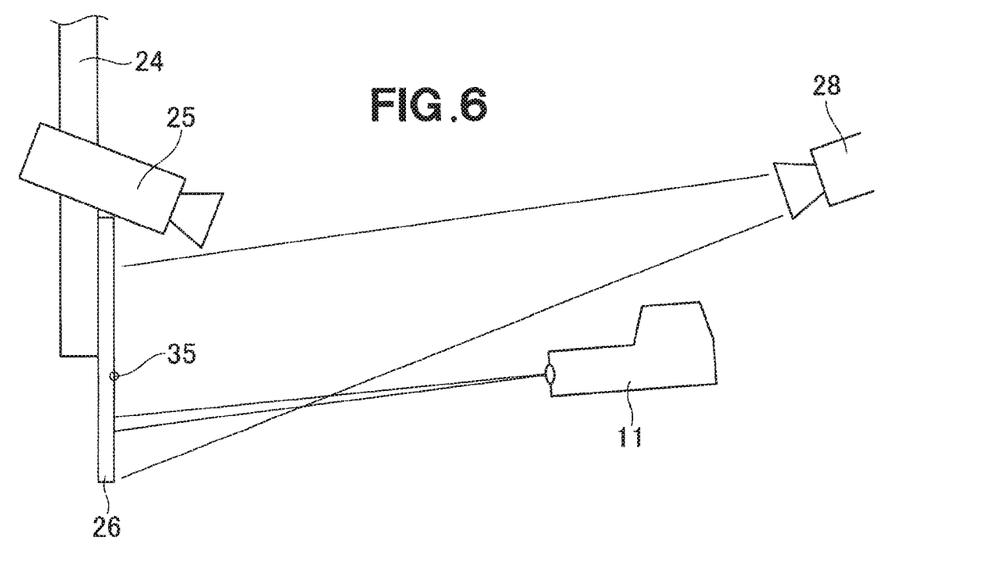
FIG. 6 is a view illustrative of the operation of a second camera.
Figure 7A:
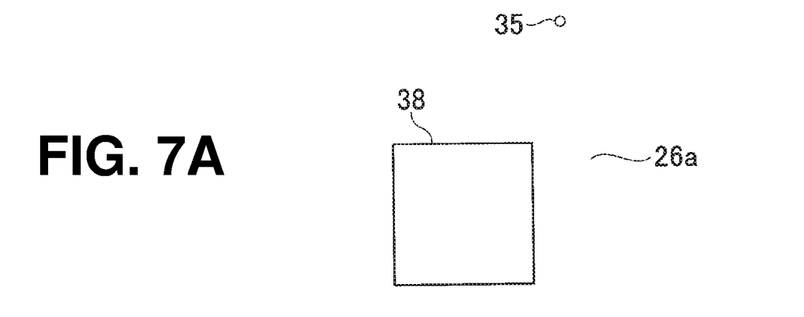
FIGS. 7A-7B schematically illustrate optical images projected on a screen.

As shown in FIG. 6, the laser distance meter 11 irradiates near-infrared rays onto the screen 26, and the second camera 28 captures an image of the screen 26. The captured image is shown in FIG. 7A. As shown in FIG. 7A, the point light source 35 and a rectangular optical image 38 are present on the light receiving surface 26a. It is desirable that the light receiving surface 26a is colored in black. This is because the black-colored light receiving surface 26a is able to make the red-colored point light source 35 clear.

Figure 7B:
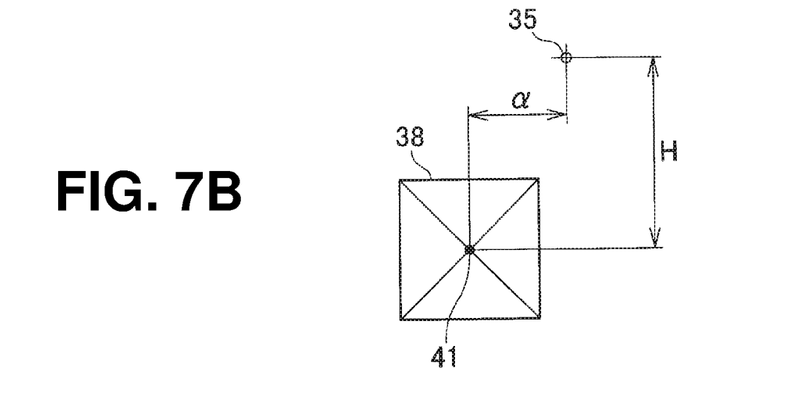

The rectangular optical image 38 is a piece of surface information and hence requires a complicated post-processing. To deal with this problem, an image analyzing method is used to determine coordinates of a gravity center 41 of the optical image 38, as shown in FIG. 7B. Since the gravity center is likely to be confused with the center of mass, it will be referred to as the center of the figure, i.e., "centroid 41". Once the coordinates of the centroid 41 is determined, it is possible to determine a difference H in height between the centroid 41 and the point light source 35. Furthermore, by determining the coordinates of the centroid 41, it is also possible to determine a horizontal shift or deviations between the centroid 41 and the point light source 35.

Figure 8A:
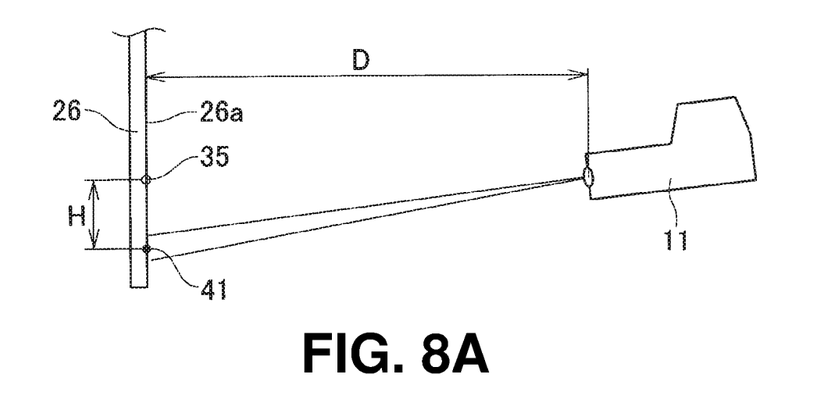
FIGS. 8A-8C illustrate a procedure for geometrically calculating an optical axis angle.

As shown in FIG. 8A, a distance D from the laser distance meter 11 to the screen 26 (precisely, light receiving surface 26a) is specified. Since the vehicle 10 is positioned as shown in FIG. 3 and since the position of the screen 26 along the line is determined, the distance D can be unequivocally determined.

Figure 8B:
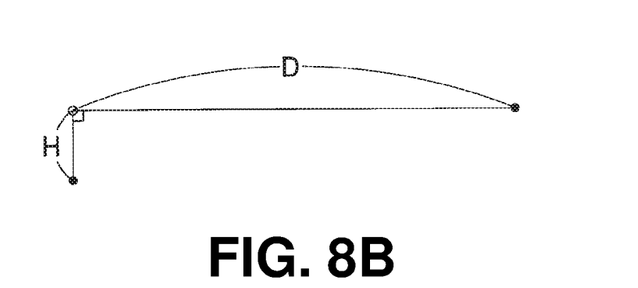
Figure 8C:
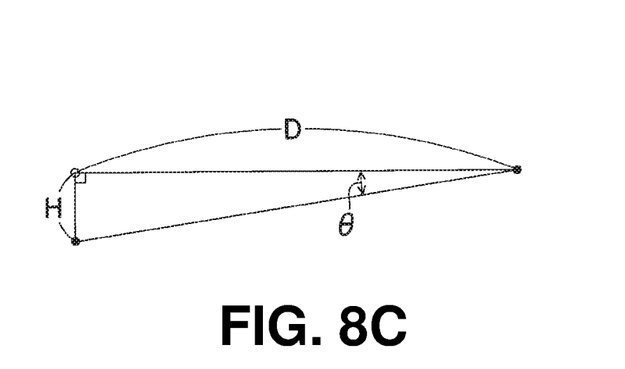

As shown in FIG. 8B, a base having a length equal to the distance D and a vertical side having a length equal to the difference H in height are drawn, so that we can image a right angled triangle as shown in FIG. 8C. The operation to solve the equation $\theta = \tan^{-1}(H/D)$ presents an optical axis angle θ of the laser distance meter 11.

It will be appreciated from the structure and operation discussed above that the optical axis angle inspection device 20 of the present invention is desirably operated in the following procedure.

Figure 9:
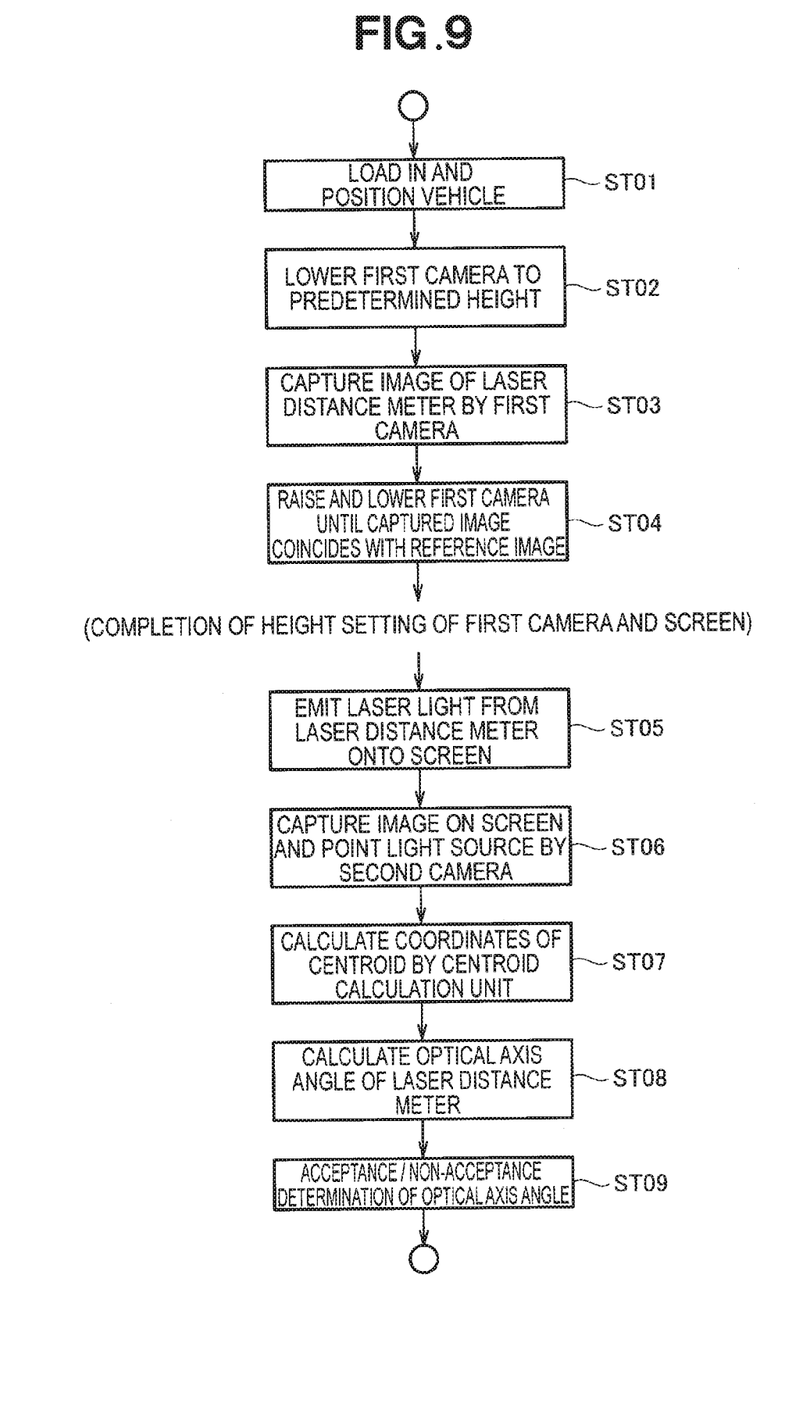
FIG. 9 is a flowchart that determines the optical axis angle.

As shown in FIG. 9, the vehicle is loaded in and positioned by the vehicle positioning mechanism 21 (FIG. 3) with respect to a front-and-rear direction of the vehicle and a width or lateral direction of the vehicle (ST01). Then, the first camera and the screen, which are standing-by at a position above the vehicle, is lowered to a predetermined height (ST02).

Subsequently, the first camera picks up or captures an image of the laser distance meter as explained above with reference to FIG. 4 (ST03), and a shift amount "a" is calculated and the first camera 23 is raised or lowered so that the shift amount "a" is zero or eliminated (ST04). When the shift amount "a" is eliminated, the first lift mechanism is stopped and the height position of the screen is fixed. Though not shown in the flowchart, the second camera is lowered by the second lift mechanism which is operated in synchronism with the operation of the first lift mechanism (in the same direction and at the same speed as the first lift mechanism).

As previously discussed with reference to FIG. 6, the laser distance meter emits laser light (near-infrared rays) onto the screen (ST05), and an optical image and a point light source projected on the screen are picked up or captured by the second camera (ST06). Then, coordinates of a centroid is calculated in the manner as discussed above with reference to FIGS. 7A-7B (ST07).

Subsequently, as previously described with reference to FIGS. 8A-8C, an optical axis angle θ is calculated from the distance D and the difference H in height (ST08). When the calculated optical axis angle θ satisfies an acceptability criterion, it is judged as "acceptable". Alternatively when the calculated optical axis angle θ fails to satisfy the acceptability criterion, it is judged as "non-acceptable" (ST09).

The optical axis angle inspection device 20 of the present invention is provided with not only the second camera 28 but also the first camera 25. As discussed above with reference to FIGS. 4 and 5, by virtue of the first camera 25, the height of the point light source 35 can be made coincident with the height of (the lens of) the laser distance meter.

Due to various factors, the height of the laser distance meter differs from each variable. Taking this into consideration, the first camera 25, the first lift mechanism 24 and the height control unit 31 are provided so that the height of the point light source 35 is made consistent with the height of (the lens of) the laser distance meter. By virtue of this pre-processing, detection of the optical axis angle by the second camera can be easily achieved.

As shown in FIG. 3, the screen 26 is vertically movably suspended by the first lift mechanism 24 together with the first camera 25. With this arrangement, the screen 26 is adjustable in height such that the screen 26 comes close to the windshield 14 without interference with the windshield 14. The screen 26 can be therefore located at a position rearward of front ends of the front wheels 22 of the vehicle.

INDUSTRIAL APPLICABILITY

The present invention is particularly suitable for application to an optical axis angle inspection device for a laser distance meter mounted on a vehicle.

REFERENCE SIGNS LIST

10: vehicle, 11: laser distance meter, 11a: lens of laser distance meter, 20: optical axis angle inspection device, 21: vehicle positioning device, 24: first lift mechanism, 25: first camera, 25a: optical axis of first camera, 26:

screen, 26a: light receiving surface, 27: second lift mechanism, 28: second camera, 31: height control unit, 32: centroid calculation unit, 34: acceptance/non-acceptance determination unit, 35: point light source, 36: captured image, 37: reference image, 38: optical image, a: shift amount θ: optical axis angle, D: distance from screen to second camera, H: difference in height between point light source and centroid

The invention claimed is:

1. An optical axis angle inspection device for inspecting an optical axis angle of a laser distance meter mounted on a vehicle, the optical axis angle inspection device comprising:
   a vehicle positioning mechanism for positioning the vehicle in a predetermined position;
   a first camera vertically movably suspended by a first lift mechanism at a position rearward of front ends of front wheels of the vehicle and forward of the laser distance meter for capturing an image of laser distance meter;
   a screen suspended by the first lift mechanism for projection with an image of light emitted from the laser distance meter;
   a point light source provided on the screen at a position separated from the first camera by a difference in height from the first camera to the laser distance meter determined based on an angle of inclination of an optical axis of the first camera with respect to the horizontal and a horizontal distance from the first camera to the laser distance meter;
   a second camera vertically movably suspended by a second lift mechanism at a position rearward of the screen in a front-and-rear direction of the vehicle for capturing the image projected on the screen and the point light source;
   a height control unit which calculates a shift amount between the image picked up by the first camera and a reference image and operates the first lift mechanism to raise and lower the first camera and the screen in such a manner as to eliminate the shift amount;
   a centroid calculation unit which, after completion of the control by the height control unit, obtains from the second camera the optical image projected on the screen based on the emitted light from the laser distance meter and calculates coordinates of a centroid of the optical image;
   an angle calculation unit which calculates an optical axis angle of the laser distance meter from two items of information consisting of a difference in height from the centroid of the optical image obtained from the centroid calculation unit and a distance from the screen to the laser distance meter; and
   an acceptance/non-acceptance determination unit which determines whether a calculated optical axis angle value obtained by the angle calculation unit satisfies an acceptability criterion of the optical axis angle.

2. The optical axis angle inspection device according to claim 1, wherein the height control unit performs control of the second lift mechanism in synchronism with the first lift mechanism.

3. The optical axis angle inspection device according to claim 1, wherein the screen has a light receiving surface colored in black.

* * * * *